Patented Sept. 25, 1945

2,385,374

UNITED STATES PATENT OFFICE 2,385,374

AQUEOUS BONDING COMPOSITION

Philip Hamilton Rhodes, Portland, Maine, assignor to Pennsylvania Coal Products Company, Petrolia, Pa., a corporation of Pennsylvania No Drawing. Application December 3, 1942, Serial No. 467,788

6 Claims. (Cl. 260—30)

The present invention relates to the production and utilization of a resin adhesive or bonding material comprising the set reaction product of a setting agent and a stable aqueous solution of a resin condensation product derived from a mixture of a dihydroxy benzene, as, for example, resorcin, and an aldehyde in which the molecular ratio of the latter to the former is less than one. Preferably, the setting agent is a methylene containing compound.

The dihydroxy benzene aldehyde bonding agent herein set forth which is particularly valuable in the production of laminated structures is characterized by the property of setting at exceedingly low temperatures in the neighborhood of 200° to 225° F., and the bond is resistant to decomposition and to deterioration upon exposure to atmospheric conditions including high humidity and high temperature such as may be encountered in desert countries. The bonds are equally resistant to low temperatures adjacent the freezing point or therebelow. In view of the low temperature of cure of the herein disclosed resin adhesives, they are valuable in the bonding of organic materials which are greatly deteriorated if cured at temperatures substantially over 225° F. or in the neighborhood of 300° to 350° F., which are the curing temperatures of the monohydric phenolic aldehyde resins. Cloth, paper, rubber and leather articles or laminae may be bonded with the adhesive composition produced as herein set forth. It is of particular value as a bonding agent in the production of plywood.

More specifically, the present invention relates to the production of articles which are bonded with the set reaction product of a setting agent and a stable aqueous solution of a resin condensation product derived from a mixture of a dihydroxy benzene and an aldehyde in which the molecular ratio of the aldehyde to the dihydroxy benzene varies from .6 of the former to 1 of the latter to .95 of the former to 1 of the latter, said aqueous solution having been stabilized by its having a pH exceeding 5, and below that point at which the bonding agent becomes so alkaline that its waterproofness is materially reduced. Usually the pH of the stable solution should not exceed 9. In the preferred form of the invention, the pH of the solution is preferably between 7 and 9, although the upper pH limit may be greater than 9 if the strength of the bond can be somewhat reduced.

It has been discovered that when a resin solution of a dihydroxy benzene aldehyde condensation product having a pH not exceeding 3 and usually ranging from 1.5 to 3, has its pH value increased to about 5 or 5.5, the tendency of the resin solids of the aqueous solution to precipitate shortly after the preparation of said solution is decreased. It has been further discovered that this decrease in tendency of the aqueous resin solution to precipitate the resin solids thereof decreases as the pH of the resin solution is increased above 5 or 5.5, and that the best stability is conferred upon the aqueous resin solution when the pH of the solution exceeds 7. The upper limit of the pH value is that which will not materially reduce the waterproofness of the cured bond. Usually, the upper pH limit is around 9. In other words, the higher the pH, the greater the stability of the resin solution. Between 5 and 7, a dilute solution containing about 30% of resin solids will keep for several days, and when the pH exceeds 7, the solution is substantially entirely stabilized; that is, it will not precipitate solids when it stands or is stored for an indefinite period of time.

In connection with the above, it is desired to point out that a 50% solution in water of a dihydroxy benzene aldehyde resin produced as herein set forth is stable, but that when the solution is diluted so that the resin content thereof is 30% or below, precipitation occurs. Therefore, the present invention in one of its aspects is directed to the pH control of a dilute resin solution of the character set forth to prevent precipitation of the resin solids thereof.

It has also been discovered that if a permanently fusible dihydroxy benzene-aldehyde resin of the character herein set forth is treated with a methylene containing setting solution, as, for example, hexamethylene tetramine, the pH of the resin solution should be maintained within a range which will inhibit any precipitation of solids from the hexamethylene tetramine solution. In general, it is necessary to maintain the herein disclosed resin solution at a pH of at least 5 or 5.5 or around 6, depending on the exact method of preparation of the resin solution in order to avoid precipitation of the solid particles from the hexamethylene tetramine solution.

In view of the above, the invention is directed to a method of preparing an aqueous bonding liquid comprising adding hexamethylene tetramine to an aqueous solution of a resinous reaction product of a mixture of an aldehyde and a dihydroxy benzene, as for example, resorcin, in the molecular ratio of .6 to .95 of the aldehyde to 1.0 of the dihydroxy benzene, the hexamethylene tetramine being added in an amount sufficient to make the resin reaction product heat-reactive, said aqueous solution having a pH varying between about 7 and about 9, thereby permitting dilution of the solution to a resin-solids-content lower than 30% while remaining stable.

The invention also comprises an aqueous bonding liquid containing a heat-reactive mixture of hexamethylene tetramine and an aqueous solution of a resinous reaction product of a mixture of an aldehyde and a dihydroxy benzene, typified by resorcin, in the molecular ratio of .6 to .95 of the aldehyde to 1.0 of the dihydroxy benzene, said aqueous solution having a pH varying between about 7 and about 9, thereby permitting dilution to a resin-solids-content lower than 30% while remaining stable.

The following is an example setting forth the production of a liquid dihydroxy benzene aldehyde resin plywood adhesive in which the pH of the solution is maintained between 7 and 9:

*Example 1*

| | Grams |
|---|---|
| Resorcin | 2,500 |
| 37% formaldehyde | 1,250 |
| Water | 2,600 |

The resorcin in 500 grams of the liquid formaldehyde is placed in a suitable reaction vessel, as, for example, a steam jacketed kettle with a cover, an addition hole, a simple reflux condenser, and a variable speed agitator. The mixture of resorcin formaldehyde is heat treated in order to produce a homogeneous solution, it being usually sufficient to warm the mixture to about 100° C. Thereafter, additional formaldehyde in the amount of about 750 grams is added, it being preferable to add the formaldehyde as rapidly as possible without exceeding the capacity of the reflux. During the addition, the mix should be agitated briskly enough to prevent any local action such as would induce the formation of insoluble set-up or partially set-up particles. As soon as the formaldehyde has been completely added, a suitable amount, as for example, 15 grams of oxalic acid is added in order to complete the reaction. This oxalic acid is in solution or may be in a powdered state. To insure the complete tie-up of all of the aldehyde added, it is desirable to reflux the resulting mass for a suitable length of time after the addition of the oxalic acid. Usually about 5 minutes is sufficient. Thereafter, the steam is turned off in the jacket so that heating terminates and the cover and the reflux may be removed. The 2600 grams of water mentioned in the complete tabular formation of Example 1 is then added and the resulting product is well stirred to form a homogeneous liquid mass.

The resulting solution has a pH varying between 1.5 to 3. In order to bring the pH of the solution up to a range varying from 7 to 9, there is added an alkali, preferably a concentrated solution of alkali, to keep the water content of the solution within an appropriate range. Any medium which will effect this pH concentration may be used, including inorganic or organic alkaline compounds. The change in the pH of the solution may be effected by sodium hydroxide, potassium hydroxide, ammonium hydroxide, lithium hydroxide, which are all examples of inorganic alkaline mediums, and by the ethanol amines, including tri-thanol amine, which is an example of organic alkaline medium. The above are set forth by way of illustration and not by way of limitation. The pH range of the solution may be brought up by adding thereto 65 to 75 grams of sodium hydroxide dissolved in 150 grams of water.

Thereafter, a filler such as walnut shell flour, known as "Glufil," barium sulphate, or other fillers or extenders commonly used in plywood glues may be added, some of these fillers having a supplemental adhesive action, as, for example, the protein fillers such as casein, soya bean meal, peanut meal, zein, and the like. These materials act as fillers and/or extenders. To the mix set forth in Example 1, 1800 grams of Glufil may be added.

The following is an additional example in the preparation of a permanently fusible dihydroxy benzene-aldehyde resin solution useful in general as an impregnating and bonding agent in the production of laminated articles including cloth; paper; wood; materials made from organic substances, such as cotton, wool, and the like; mineral laminae made from glass fibers, asbestos, mineral wool fibers, and the like; and materials made from synthetic fibers.

*Example 2*

2500 grams of resorcin are mixed with 500 grams of 37% formaldehyde and treated as set forth in the first example. Thereafter, 750 grams of 37% formaldehyde are added and the resulting mass is briskly agitated. Thereafter, as in the previous example, 15 grams of oxalic acid are added to complete the reaction. To insure complete tie-up of the formaldehyde, the reaction product is refluxed for a suitable length of time, as, for example, 5 minutes.

To the resulting resin or resinous solution, there are added 2300 grams of water. The pH of the resin or resinous solution is then adjusted to between 5 to 9, and preferably to between 7 to 9, by adding to the solution between 65 to 75 grams of sodium hydroxide dissolved in 150 grams of water.

The solution produced in accordance with Example 2 is more concentrated than that produced from the batch set forth in Example 1. The solution produced in accordance with Example 2 has a resin content varying between 45% to 50% of solids, whereas the mixture produced in accordance with Example 1 has a resin content of 30% to 35% when it carries the Glufil extender. One of the outstanding advantages of these solutions of permanently fusible dihydroxy benzene-aldehyde resins is that they are stable; that is, they keep indefinitely, thereby enabling resin solutions to be kept for relatively long periods and shipped without any necessity for maintaining in the shipping cars, boats and airplanes, predetermined humidity and/or temperature conditions. Another advantage of these resin solutions is that they may be diluted infinitely with water and the resin content will not precipitate. If the pH is not maintained as specified, when the solution is diluted below 30%, precipitation of the resin solids is apt to occur. Further, it is desired to point out that the resin solutions may be prepared in concentrations higher than above set forth, as, for example, as high as about 75% of resin solids, and because the pH is maintained as set forth, said solutions may be diluted to any desired range in accordance with the particular purpose for which the solution is to be utilized. It is therefore one of the features of the present invention to produce a dihydroxy benzene-aldehyde resin solution which needs a setting agent to make it heat reactive, said solution having a very high resin content, as, for example, from 50% to 80%, and having its pH maintained between 5 and an upper pH limit which will not impair the waterproofness of a set bond, said pH desirably varying from 5 to 9 and preferably 7 to 9. Such a solution which is a concentrated solution having the desired pH may be marketed in its concentrated state, and then when the consumer desires to use the solution, it may be diluted so that its solid contents are less than 30% and the solution will still maintain itself; that is, solids will not be precipitated therefrom.

Maintenance of the pH concentrations of these solutions within a range varying from 5 to 9 and preferably varying from 7 to 9 offers the advantage that the permanently fusible dihydroxy benzene-aldehyde resin may be converted into a heat reactive or thermosetting solution by the addition of the proper amount of hexamethylene tetramine or equivalent setting agents without precipitation of the resin solids. Preferably, the hexamethylene tetramine is added in solution, as for many operations it is the most practical procedure, although in some cases where the addition of a further liquid to the resin solution would too greatly lower the viscosity or the concentration of the final resin solution, the hexamethylene tetramine may be added in a solid state. The hexamethylene tetramine crystals or the equivalent compound is usually added in an amount varying between 5% to 15% taken on the weight of the resin solids present in the resin solution having the pH hereinbefore described.

A solution of hexamethylene tetramine may be made by adding 270 grams of the hexamethylene tetramine crystals to 450 grams of water. This forms a stable hexamethylene tetramine solution. In order to make the dihydroxy benzene-aldehyde resin solution produced in accordance with Example 1 heat reactive, about 86 grams of the hexamethylene tetramine solution prepared as above set forth is added to about 1000 grams of the resin solution, and the resulting mass is stirred to produce a homogeneous, spreadable dihydroxy benzene-aldehyde resin hexamethylene tetramine addition product.

In order to make the resorcin-formaldehyde resin solution produced in accordance with Example 2 heat reactive, about 116 grams of the hexamethylene tetramine setting solution prepared as above set forth is mixed with 1000 grams of the resorcin-formaldehyde resin solution. The resulting heat reactive adhesive may be used as a bonding medium in the hot pressing of plywood at temperatures of 200° to 225° F., or somewhat higher temperatures, or as a laminating varnish in the production of laminated articles.

Instead of using formaldehyde, other aldehydes may be used, such as acetaldehyde, paraldehyde, propionaldehyde, the butyl aldehydes, the furfuralaldehydes, and the like. Instead of using a single aldehyde, it is within the province of the present invention to react the dihydroxy benzene with a mixture of aldehydes such as a mixture of formaldehyde and butyl aldehyde. Dialdehyde may be used in place of the monoaldehydes. As a representative of the dialdehydes, glyoxal is set forth.

In the examples given, oxalic acid has been used as the acid catalyst. However, in lieu thereof, there may be used mineral acids such as hydrochloric acid, sulphuric acid; weak inorganic acids such as boric acid; and organic acids such as citric acid, salicylic acid, acetic acid, and the like.

Instead of using an acid catalyst, mild alkaline catalyst may be used, such as borax, sodium hydroxide, azoxytoluidine, analine, and the like. When these catalysts are used, they are preferably added at the same point at which the herein described acid catalyst is added; namely, after the complete addition of the formaldehyde or equivalent aldehyde.

The percentage of catalyst is taken upon the amount of dihydroxy benzene, as, for example, resorcin, used in carrying out the reaction. In general, the amount of the catalyst used will vary between about .1% to 2%. This is set forth by way of illustration and as the preferred percentage of catalyst. Obviously, however, the amount of catalyst used will vary depending upon the character of the reacting constituents and the manner in which the reaction is carried out.

Instead of using a catalyst, the reaction between the dihydroxy benzene and the aldehyde may be carried out in the absence of any catalyst, but using a somewhat longer reaction period. However, there are certain advantages connected with the use of catalysts and therefore in the preferred method of producing the condensation products, acid, neutral or alkaline catalysts are used.

While the present invention has been set forth in connection with the utilization of resorcin as a dihydroxy benzene, it is within the province of the present invention to use catechol and hydroquinone.

The resins herein set forth may be dehydrated until they have a moisture content varying between .1% to 1% taken on the weight of the finished dry resin. However, as far as the dehydration step is concerned, in carrying out the present invention it is not necessary that the resin be dehydrated. On the contrary, it is desirable that an aqueous solution be initially made. However, if a dehydrated resin is used, it may be brought into solution so as to provide a concentrated solution containing 75% to 80% of the resin, said solution being capable of dilution to below 30% and still maintain its equilibrium and stability; or there may be initially provided a dilute solution. Both the concentrated solution and the dilute solution are treated so that the pH thereof will range from 5 to 9 and preferably from 7 to 9.

The stable resin solution of the present invention may be set up with a compound containing methylol radicals, as, for example, a solution of polymethylolphenol including its alkali salts. The following methylol containing compounds may also be used as setting agents: the methylol para cresols, methylol resorcinol, the methylol xylenols, dimethylol urea, dimethylol thiourea, and methylol melamines.

The dihydroxy benzene-aldehyde resin adhesives herein disclosed and their equivalents, produced in accordance with the general disclosures of the present application, may be used in the production of airplane structures, boats, furniture, light structural sections such as beams and arches. The invention is of particular value in the production of laminated wood, plywood or wherever it is desirable to bond plies of cellulosic material to each other or to provide a laminated or panel structure which may comprise a layer of wood together with a layer of cotton fibers, cloth or asbestos. The plies which are bonded with the adhesives of the present invention may be inorganic in character, as, for example, asbestos.

Not only are the dihydroxy benzene resins herein set forth characterized by a low temperature of cure, but they are likewise characterized by a rapid speed of cure so that the advantages of a low temperature of cure may be obtained on a commercial cycle. These resins also offer the advantage that there is no excessive drying out of wood members or plies as the temperature of cure is exceedingly low, as, for example, between 200° and 225° F.

In the production of airplane structures and boat structures, instead of the alternate plies or layers being of wood, there may be a layer of wood, then a layer of cotton fibers or cloth or asbestos, and then a layer of wood and another layer of cotton fibers or cloth or asbestos. In other words, it is not necessary that both plies be of wood. Only one ply need be of wood and in some cases, the invention may be carried out by using plies of cloth, cotton or other textile material or plies of inorganic material which may be mineral in character, typified by asbestos. Any of these materials or equivalent materials may be used, the only limitation being that the material must not be damaged at the temperature of curing which is in the neighborhood of 200° to 220° F.

In the production of large structural articles, such as large sections of airplanes, large objects of furniture, and sections of boats, such as the hull of a dinghy, the lamination of the formed article by the conventional methods of pressing is difficult due to the size of the articles being formed. In such cases, it is necessary to wrap the object around the form or use the technique of bag molding in an autoclave. In cases such as this, it has been found that the herein disclosed resins are particularly advantageous because the heat penetration of such large objects is much more difficult than standard panels and the low temperature curing of these resins lowers the time cycle and the temperature necessary to produce the proper bonding.

Employing bag molding, the laminae with the adhesive applied are placed in position either inside or outside of a hard mold. Pressure is then applied by means of a rubber bag which is wrapped around the piece or inserted in the core of the piece and pumped up with air to the desired pressure. Pressures in this case generally range from 50 to 60 pounds per square inch. In many cases, the whole assembly is slid into an autoclave and baked at a temperature sufficient to cure the resin, which, in this case, utilizing the herein disclosed resins, may be as low as 200° to 220° F. As a variation of the procedure above set forth, the laminae may be clamped into position with spring clamps and the whole structure placed in an autoclave and cured therein at a temperature as low as 200° to 220° F. Utilizing bag molding, pressure may be applied by using a paper or Cellophane bag. To generate the desired pressure, hot water or steam may also be used.

Having thus described the invention, what is claimed as new and desired to be secured by Letters Patent is:

1. The method of preparing an aqueous bonding liquid comprising adding hexamethylene tetramine to an aqueous solution of a resinous reaction product of a mixture of an aldehyde and a dihydroxy benzene in the molecular ratio of .6 to .95 of the aldehyde to 1.0 of the dihydroxy benzene, the hexamethylene tetramine being added in an amount sufficient to make the resin reaction product heat-reactive, said aqueous solution having a pH varying between about 7 and about 9, thereby permitting dilution of the solution to a resin-solids-content lower than 30% while remaining stable.

2. The method of preparing an aqueous bonding liquid comprising adding hexamethylene tetramine to an aqueous solution of a resinous reaction product of a mixture of an aldehyde and resorcin in the molecular ratio of .6 to .95 of the aldehyde to 1.0 of the resorcin, the hexamethylene tetramine being added in an amount sufficient to make the resin reaction product heat-reactive, said aqueous solution having a pH varying between about 7 and about 9, thereby permitting dilution of the solution to a resin-solids-content lower than 30% while remaining stable.

3. The method of preparing an aqueous bonding liquid comprising adding hexamethylene tetramine to an aqueous solution of a resinous reaction product of a mixture of formaldehyde and resorcin in the molecular ratio of .6 to .95 of the formaldehyde to 1.0 of the resorcin, the hexamethylene tetramine being added in an amount sufficient to make the resin reaction product heat-reactive, said aqueous solution having a pH varying between about 7 and about 9, thereby permitting dilution of the solution to a resin-solids-content lower than 30% while remaining stable.

4. An aqueous bonding liquid containing a heat-reactive mixture of hexamethylene tetramine and an aqueous solution of a resinous reaction product of a mixture of an aldehyde and a dihydroxy benzene in the molecular ratio of .6 to .95 of the aldehyde to 1.0 of the dihydroxy benzene, said aqueous solution having a pH varying between about 7 and about 9, thereby permitting dilution to a resin-solids-content lower than 30% while remaining stable.

5. An aqueous bonding liquid containing a heat-reactive mixture of hexamethylene tetramine and an aqueous solution of a resinous reaction product of a mixture of an aldehyde and resorcin in the molecular ratio of .6 to .95 of the aldehyde to 1.0 of the resorcin, said aqueous solution having a pH varying between about 7 and about 9, thereby permitting dilution to a resin-solids-content lower than 30% while remaining stable.

6. An aqueous bonding liquid containing a heat-reactive mixture of hexamethylene tetramine and an aqueous solution of a resinous reaction product of a mixture of formaldehyde and resorcin in the melocular ratio of .6 to .95 of the formaldehyde to 1.0 of the resorcin, said aqueous solution having a pH varying between about 7 and about 9, thereby permitting dilution to a resin-solids-content lower than 30% while remaining stable.

PHILIP HAMILTON RHODES.